United States Patent [19]

Gladhart

[11] Patent Number: 5,097,972
[45] Date of Patent: Mar. 24, 1992

[54] LOG SKIDDING CARRIAGE

[75] Inventor: David Gladhart, Orofino, Id.

[73] Assignee: Christy Mfg., Inc., Orofino, Id.

[21] Appl. No.: 465,026

[22] Filed: Jan. 16, 1990

[51] Int. Cl.$^5$ ............................................. B66C 21/00
[52] U.S. Cl. ..................................... 212/122; 212/114
[58] Field of Search ..................................... 212/71-124

[56] References Cited

U.S. PATENT DOCUMENTS

| | | | |
|---|---|---|---|
| 68,874 | 9/1867 | Hawley | 212/114 |
| 1,121,742 | 12/1914 | McCay | 212/114 |
| 3,863,774 | 2/1975 | Brandt | 212/122 |
| 3,948,398 | 4/1976 | Christensen | 212/122 |
| 4,262,811 | 4/1981 | Montague | 212/110 |
| 4,456,131 | 6/1984 | Kuehn | 212/122 |
| 4,515,281 | 5/1985 | Maki | 212/76 |

*Primary Examiner*—Joseph F. Peters, Jr.
*Attorney, Agent, or Firm*—Wells, St. John & Roberts

[57] ABSTRACT

A fail-safe log skidding carriage for skyline logging operations utilizes parallel clamp assemblies for engagement of the skyline or dragline in a repeating alternating sequence. The outer ends of a pivoted crank are operably connected to the movable shoes of the two clamp assemblies to move them between operative and released clamping conditions. The crank is moved overcenter with respect to a reference line perpendicular to the lines of contact between the crank and the clamp assemblies and intersecting the pivot axis of the crank, thereby preventing accidental mechanical release of a locked crank assembly should hydraulic failure occur during use of the carriage. The hydraulic system is remotely controlled through a radio receiver that sequences the hydraulic cylinder from one extreme position to the other. An overriding electrical control is provided to assure clamping of the dragline when a log or logs are lifted to the carriage.

5 Claims, 2 Drawing Sheets

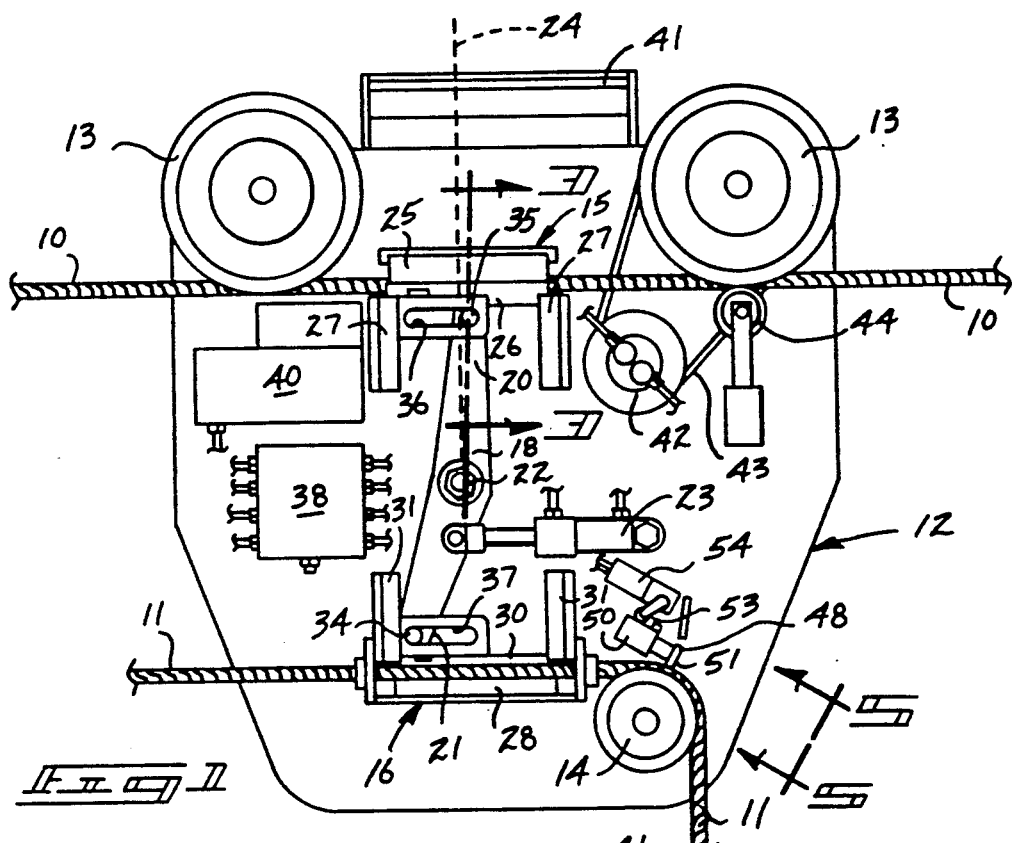
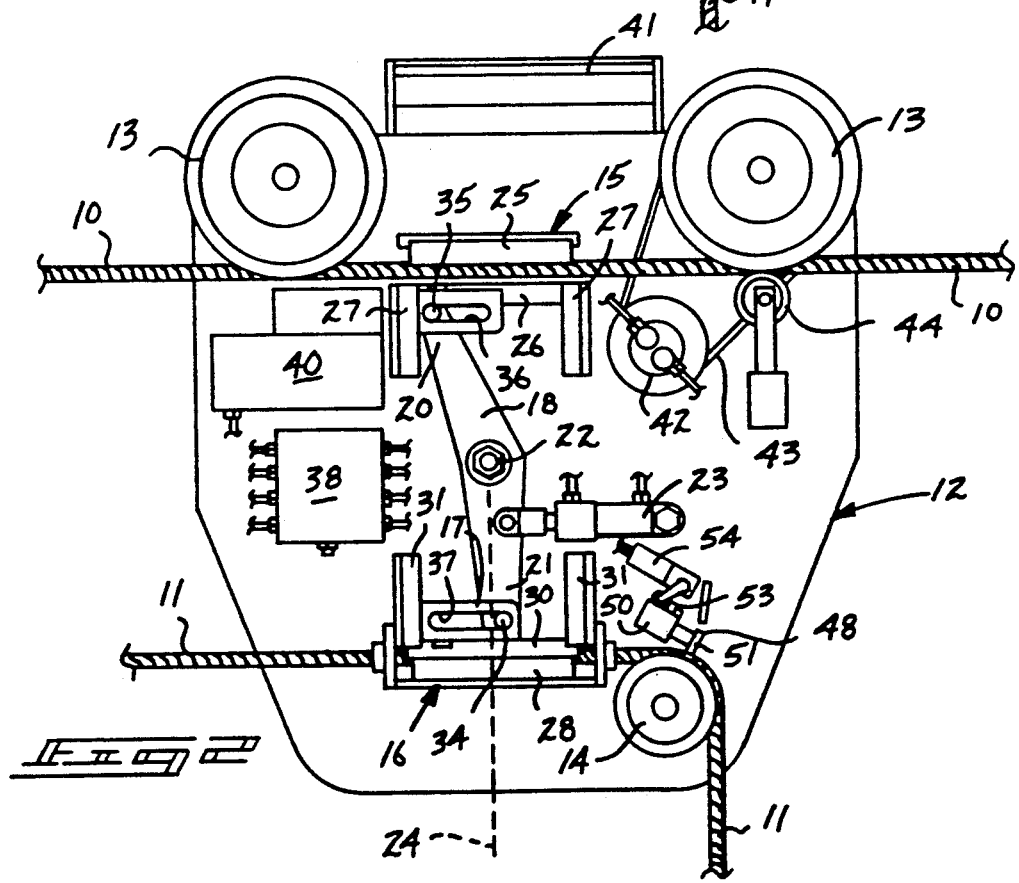

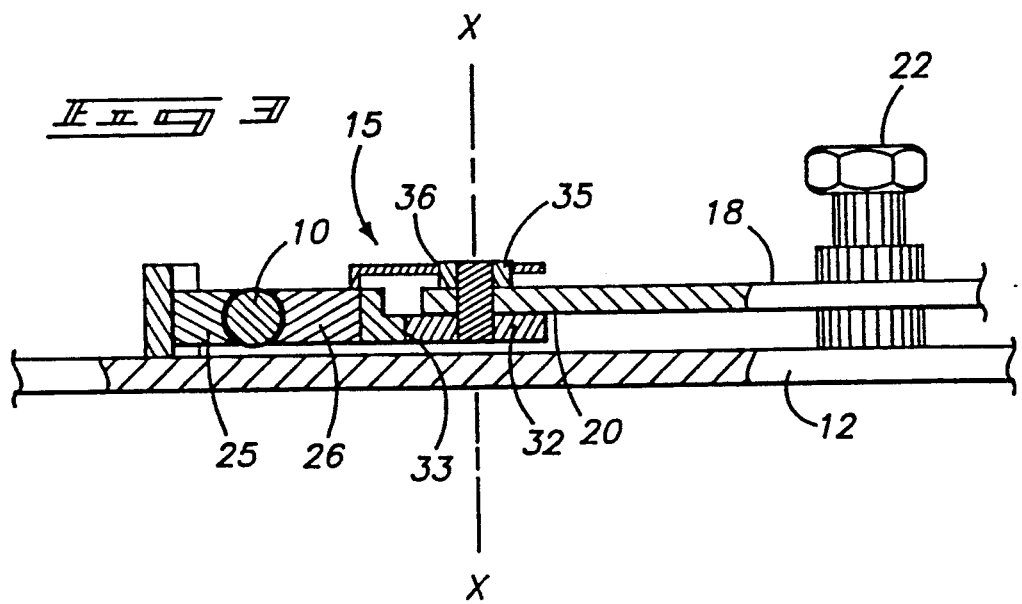
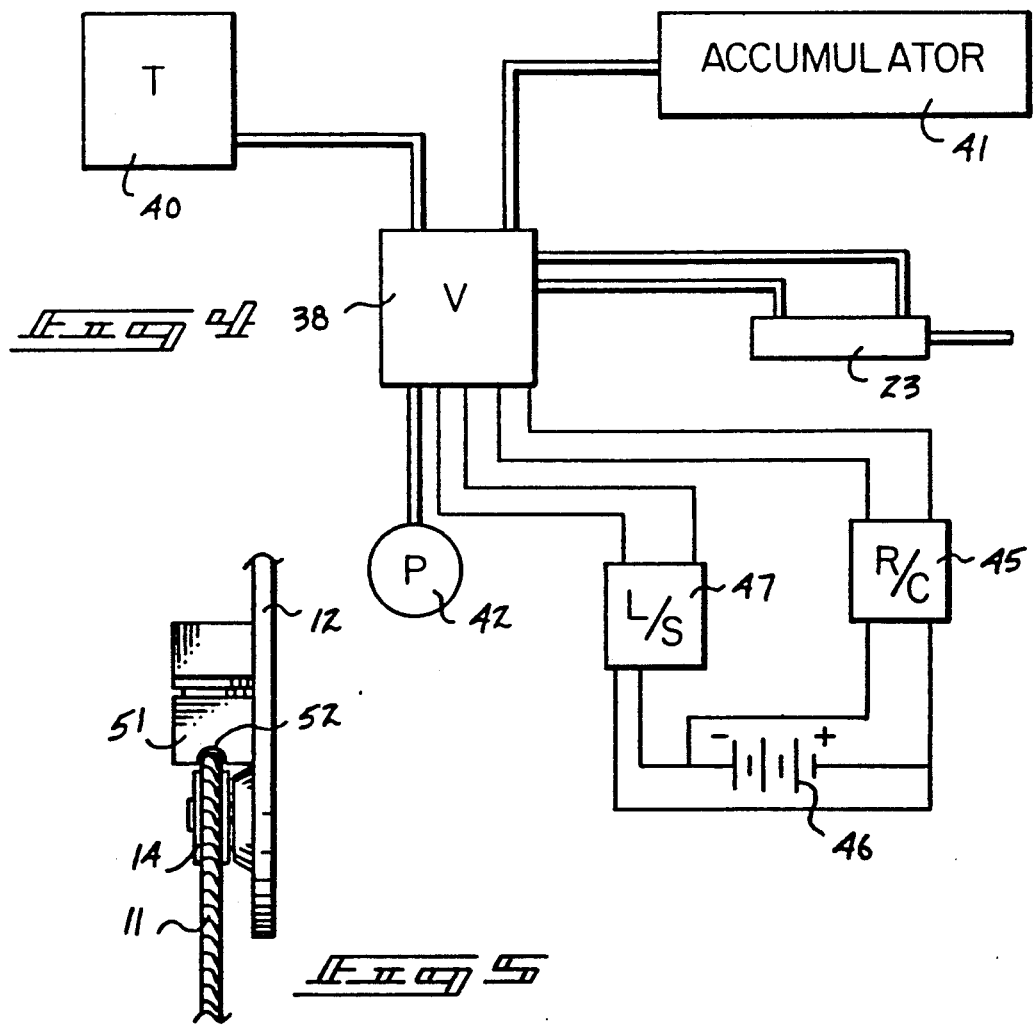

LOG SKIDDING CARRIAGE

TECHNICAL FIELD

This disclosure relates to remotely controlled log skidding carriages used in skyline logging systems for moving harvested logs to a landing area.

BACKGROUND OF THE INVENTION

Skyline logging processes, used extensively in mountainous or hilly logging operations, require effective operation of a log skidding carriage for playing out and retracting a drag line while a movable carriage is suspended on a skyline. The skyline is stretched between two supports in an inclined direction. The log skidding carriage travels along the skyline to carry logs along its length. The dragline is controlled by a reel at the upper end of the skyline system. The dragline is reeled in to pull the carriage uphill and reeled out as the carriage moves downhill due to gravity. It is also reeled in or out while the carriage is locked in a stationary position on the skyline to move logs attached to the dragline toward or away from the carriage.

Logs are moved along a skyline system by attaching one or more logs to the dragline. The dragline is then used to raise the logs up to the carriage, which can then be moved uphill or downhill to a landing where the logs are lowered and released by operation of the dragline.

To operate a log skidding carriage of this nature, one must control operation of the dragline reel and a pair of alternately engageable clamps that sequentially lock either the skyline or the dragline relative to the log skidding carriage. An example of a mechanical clamping system for this purpose is disclosed in U.S. Pat. No. 3,948,398, issued Apr. 6, 1976 to Christensen. An example of a radio controlled carriage is shown in U.S. Pat. No. 4,515,281, issued May 7, 1985 to Maki. Each of these patents describes skyline logging operations in greater detail, and no further elaboration of this well-known system is believed necessary to an understanding of the present invention.

The development of skyline logging systems has led to increased demand for radio controlled log skidding carriages, which provide greater versatility to the carriage operation by making it possible to stop the carriage at any location along the skyline. However, prior carriages of this nature have utilized separate clamp mechanisms for the skyline and dragline, as exemplified in the disclosure of U.S. Pat. No. 4,515,281. The present invention was developed in an effort to simplify the mechanisms of a radio controlled carriage, while also providing a mechanical interlock in each of the required cable clamps. This safety feature assures that a clamp, once locked about a cable, will not be released due to subsequent failure of associated hydraulic systems.

BRIEF DESCRIPTION OF THE DRAWINGS

The preferred embodiment of the invention is illustrated in the accompanying drawings, in which:

FIG. 1 is an elevational view of the carriage with the front cover plate removed;

FIG. 2 is a view similar to FIG. 1, showing the second position of the movable crank;

FIG. 3 is an enlarged fragmentary sectional view taken along line 3—3 in FIG. 1;

FIG. 4 is a schematic diagram of the control equipment; and

FIG. 5 is an enlarged fragmentary sectional view taken along line 5—5 in FIG. 1.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The basic mechanisms used to control the present log skidding carriage can best be understood by reference to the alternate positions of the clamps as shown in FIGS. 1 and 2. These drawings show the interior of a carriage in a vertical elevation view, the front cover of the carriage being removed to permit viewing of the interior components. The carriage supporting structure comprises a rigid frame 12 in the form of a vertical wall. The removed cover (not shown) is a similar vertical wall that overlies the apparatus illustrated in FIG. 1.

A first pair of sheaves 13 are rotatably mounted at the upper portion of frame 12 in transversely spaced positions. They are arranged on frame 12 for rolling engagement on a skyline 10. The skyline 10 remains stationary and taut at all times as a guiding support for the moving carriage.

At least one second sheave 14 is rotatably mounted on the lower portion of frame 12. Sheave 14 is provided on frame 12 for rolling engagement by a dragline 11 suspended from the carriage.

A first clamp assembly 15 is positioned above and below a straight length of skyline 10 extending between the first sheaves 13. It includes a fixed shoe 25 secured to frame 12 and an opposed movable shoe 26. The movable shoe 26 is guided on the frame 12 between inwardly facing parallel channels 27.

The fixed shoe and movable shoe 26 each have opposed operational faces with longitudinal grooves complementary to the diameter of the skyline with which they are utilized. When closed on one another, the shoes 25 and 26 grip the skyline 10 and lock the position of the carriage relative to the skyline. When opened, shoes 25 and 26 permit free relative movement between the carriage and the supporting skyline.

A second clamp assembly 16 is located beneath the first clamp assembly 15. The two clamp assemblies are essentially identical, but inverted elevationally as mirror images of one another. The second clamp assembly 16 includes a fixed shoe 28 secured to frame 12 and a movable shoe 30 guided on frame 12 in opposition to the fixed shoe 28 by a pair of inwardly facing channels 31. The second clamp assembly selectively grips the dragline 11 adjacent to the illustrated second sheave 14 or frees the dragline for movement relative to the carriage from which it is suspended. A pair of freely rotatable guide pulleys 17 are positioned outward from the end of the second clamp assembly 16 opposite to sheave 14 to assist in centering the dragline 11 between the shoes 28, 30.

Referring to FIG. 1, the left hand side of frame 12 faces uphill and the right hand side of frame 12 faces downhill when the illustrated carriage is operational. The dragline extends downwardly to a choker or other attachment device (not shown) that connects the dragline to one or more logs. The dragline extends uphill from the carriage through the clamp assembly 16 and guide pulleys 17 to a reel (not shown) at a location from which movement of the dragline is controlled in conjunction with operation of the illustrated carriage.

A rigid crank 18 serves as a common operator for the first and second clamp assemblies 15, 16. Crank 18 has a first crank end 20 associated with the first clamp assembly 15 and a second opposed crank end 21 associated with the second clamp assembly 16. Crank 18 is pivotally mounted to frame 12 about a central pivot axis by a pivot shaft shown at 22. The location of pivot shaft 22 is intermediate the crank ends. Crank end 20 is operably connected to the movable shoe 26 of the first clamp assembly 15 that is selectively engaged about skyline 10. Crank end 21 is operably connected to the movable shoe 30 of the second clamp assembly 16 that is selectively engageable about the dragline 11.

Crank 18 is shifted in position relative to frame 12 by power means illustrated by a hydraulic cylinder 23. The cylinder 23 has one end pivotally connected to frame 12 and its remaining end pivotally connected to crank 18 at a location spaced from pivot shaft 22. It is capable of selectively moving crank 18 relative to the frame 12 about the pivot axis of shaft 22 between first and second angular positions. In the first angular position (FIG. 1), the first clamp assembly 15 is operative, thereby gripping the skyline 10, and the second clamp assembly 16 is inoperative, thereby leaving the dragline 11 free to be hauled into the carriage or played out from it. The alternate or second angular position of crank 18 (FIG. 2) sets the two clamps 15, 16 in opposite conditions, the first clamp 15 now being inoperative, freeing the carriage to move along skyline 10, and the second clamp assembly 16 now being operative, securing the dragline 11 in a locked condition relative to the carriage.

The functions carried out by the carriage are conventional in skyline logging operations. No further description of these functions is believed to be necessary to an understanding of the present invention, which is directed to the carriage control assemblies.

A key feature of this apparatus is the fail-safe operation of crank 18. As is evident in FIGS. 1 and 2, the first and second crank ends 20, 21 are operably connected to the movable shoes 26, 30 of the first and second clamp assemblies 15, 16 along parallel surfaces spaced apart from one another above and below the pivot axis of crank 18 at pivot shaft 22. The operable connection between the end of crank 18 and the first clamp assembly 15 (illustrated in FIG. 3) comprises a roller 32 which rides along a surface 33 on the movable shoe 26 to selectively urge the movable shoe toward fixed shoe 25. An identical roller arrangement is provided at the opposite end of crank 18 for moving shoe 28 by engagement of a similar surface parallel to the surface 33 and positioned below the pivot axis of shaft 22.

A sectional view illustrating the first roller 32, which rolls along surface 33, is shown in FIG. 3. The roller axis is shown as line X—X.

The crank ends 20, 21 also mount coaxial smaller rollers 34, 35 that are fitted within slots 36, 37 on the movable shoes 26, 30. The roller axis for rollers 32, 35 is shown in FIG. 3 as line X—X. The interaction of rollers 34, 35 and the parallel elongated side surfaces of slots, 36, 37 pull the movable shoes 26, 30 inwardly toward pivot shaft 22 to selectively release the first and second clamp assemblies 15, 16 as the crank 18 is pivoted from one position to the other.

As can be seen in FIGS. 1 and 2, the operable connections of the crank ends 20, 21, when crank 18 is in either of its angular positions, are located at opposite sides of a reference line 24 that is perpendicular to the parallel lines of engagement between crank 18 and movable shoes 26, 30 and which intersects the axis of pivot shaft 22. The crank ends 20, 21 therefore move over-center across the imaginary reference line 24 as they progress from one angular position to the other. The over-center position of the crank end compressing a movable shoe toward the fixed shoe in one of the clamp assemblies 15 or 16 provides a mechanical interlock to assure that crank 18 will remain in its selected position regardless of intervening hydraulic failures that might occur in the power equipment associated with it. The amount of over-center travel is relatively small, so as not to appreciably release the desired clamping pressure between the movable shoe and fixed shoe that is rendered operative, but is adequate to prevent accidental movement of crank 18 about the axis of pivot shaft 22. Thus, once either of clamp assemblies 15 or 16 is rendered operative, it will remain in a gripping position against the cable associated with it until the hydraulic system subsequently operates to move it to its opposite position.

To assure adequate clamp movement and free release of one of the cables at each position of crank 18, the two arms of crank 18 leading from the axis of pivot shaft 22 to the crank ends 20, 21 are angularly spaced from one another about the axis of pivot shaft 22 by an angle of less than 180 degrees. As is evident in FIGS. 1 and 2, by moving the compression crank end just slightly over-center, the resulting movement imparted to the opposite crank end by operation of hydraulic cylinder 23 will move the releasing clamp end a much more significant angular distance from the reference line 24 to assure free cable movement between its associated clamp assembly.

FIG. 4 schematically illustrates the control system for hydraulic cylinder 23. The control system basically comprises an electrically-controlled hydraulic valve 38, a hydraulic fluid supply tank 40, a pressure accumulator 41, and a hydraulic pump 42. The pump 42 is powered from one of the first pair of sheaves 13 through sprockets and a connecting chain 43 (see FIGS. 1 and 2). A spring biased roller 44 is urged against the skyline 10 at the periphery of the sheave 13 that drives pump 42, assuring that no slippage occurs between the skyline 10 and the sheave 13. The single pump is utilized to power the hydraulic system in both directions of movement of the carriage along the skyline 10.

The electrical controls for valve 38 comprise a radio controlled receiver 45 of conventional design. Receiver 45 is responsive to signals received from a remote transmitter (not shown) to sequence the operation of hydraulic cylinder 23, which is moved from one extreme position to the other as each subsequent radio signal is received. Electrical power is provided to receiver 45 by a battery 46 on the carriage.

The control system also includes an overriding safety switch 47 that serves as limit means operably connected to the control valve 38 in parallel to receiver 45 for actuating the control valve 38 in response to detection of an incongruity in the dragline 11 adjacent to the second sheave 14 as the dragline is retracted toward the carriage. The incongruity would typically constitute an enlargement in the otherwise uniform cross-section of the cable serving as dragline 11. This enlargement might be a choker or other cable attachment, a knot, a collar, or any device used adjacent to the connection of dragline 11 to a log or logs being handled by the system.

In the illustrated embodiment, a spring biased plunger 48 is slidably mounted within a supporting sleeve 50 on the frame 12 directly adjacent to the second sheave 14.

Plunger 48 supports a face plate 51 that includes a side notch 52 through which the incoming dragline 11 can freely pass as it engages the periphery of second sheave 14 (see FIG. 5). However, if an enlargement is encountered along the dragline 11, it will engage and push upon face plate 51, causing plunger 48 to be retracted within sleeve 50. A protruding stub 53 at the side of plunger 48 then trips a limit switch 54 wired in series with receiver 45. The resulting electrical signal causes hydraulic valve 38 to be sequenced in the same manner as does an incoming signal received by receiver 45.

The purpose of the safety switch 54 is to assure that the second clamp associated with the dragline sheave 14 is actuated before the connecting equipment for a log or logs being hauled by the carriage passes over the sheave 14. If the operator is late in sending a signal through the radio controlled system, or if visibility of the carriage is impaired by fog or intervening obstacles, the switch 54 will set the second clamp assembly 16 before any damage to the mechanical equipment within the carriage can occur.

It is to be understood that the details of plunger 48, sleeve 50 and switch 54 are presented only as examples. The detection of an incongruity can occur at any location adjacent to the carriage. A proximity switch or other detection apparatus can be substituted for the mechanical limit switch illustrated.

The above apparatus provides a mechanically simple fail-safe hydraulic system that can be readily operated by radio control systems presently available. As each clamp assembly is sequentially locked, the controlling crank 18 is positioned at opposite sides of a line that is perpendicular to a length of the skyline 10 extending between the pair of first sheaves 13 and intersecting the axis of pivot shaft 22. The resulting over-center position of the locked clamp assembly prevents its accidental release until the hydraulic system is once more operated. The apparatus is capable of rugged construction to withstand the impact forces to which such a carriage is normally subjected, and has relatively few moving parts subject to mechanical failure. The result is improved safety and economy in maintaining the carriage, which is typically utilized in remote locations where maintenance is relatively costly.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A log skidding carriage for playing out and retracting a dragline while the carriage is suspended on a skyline, comprising:
    an upright rigid frame having an upper portion and a lower portion;
    first sheave means rotatably mounted on the upper portion of the frame for rolling engagement on a skyline;
    second sheave means rotatably mounted on the lower portion of the frame for rolling engagement by a dragline suspended from the carriage;
    first clamp means on the upper portion of the frame including a fixed member secured to the frame and a movable member guided on the frame in opposition to the fixed member for selectively gripping a skyline engaged by the first sheave means when the first clamp means is operative and for freeing the skyline when the first clamp means is inoperative;
    second clamp means on the lower portion of the frame including a fixed member secured to the frame and a movable member guided on the frame in opposition to the fixed member for selectively gripping a dragline engaged by the second sheave means when the second clamp means is operative and for freeing the dragline when the second clamp means is inoperative;
    means on the frame for guiding the movable members of the first and second clamp means for motion relative to the frame along a common upright direction;
    a rigid crank having two opposed crank ends, the crank being pivotally mounted to the frame about a pivot axis at a location intermediate its crank ends, one crank end being operably connected to the movable member of the first clamp means along a first surface perpendicular to the common direction of motion and the remaining clamp end being operably connected to the movable member of the second clamp means along a second surface parallel to the first surface, the crank ends being operably connected to the parallel surfaces above and below the pivot axis;
    power cylinder means operatively connected between the frame and the crank for selectively moving the crank relative to the frame about the pivot axis between a first angular position in which the first clamp means is operative and the second clamp means is inoperative and a second angular position in which the first clamp means is inoperative and the second clamp means is operative;
    the operable connections of the crank ends and movable clamp members, when the crank is in either its first or second angular position, being located at opposite sides of a line perpendicular to the first and second surfaces and intersecting the pivot axis.

2. The log skidding carriage of claim 1, wherein the crank includes two arms leading from the pivot axis to the crank ends, the two arms being angularly spaced from one another about the pivot axis by an angle of less than 180 degrees.

3. The log skidding carriage of claim 1, wherein the power cylinder means comprises a double acting hydraulic cylinder, the carriage further comprising:
    a source of pressurized hydraulic fluid;
    control valve means operably connected between the source of fluid and the hydraulic cylinder for alternately directing pressurized hydraulic fluid to opposite ends of the hydraulic cylinder when actuated; and
    receiver means responsive to a remote transmitter and operably connected to the control valve means for actuating the control valve means in response to reception of a control signal.

4. The log skidding carriage of claim 1, wherein the power cylinder means comprises a double acting hydraulic cylinder, the carriage further comprising:
    a source of pressurized hydraulic fluid;
    control valve means operably connected between the source of fluid and the hydraulic cylinder for alternately directing pressurized hydraulic fluid to opposite ends of the hydraulic cylinder when actuated;

receiver means responsive to a remote transmitter and operably connected to the control valve means for actuating the control valve means in response to reception of a control signal; and limit means operably connected to the control valve means in parallel to the receiver means for actuating the control valve means in response to detection of an incongruity in the dragline adjacent to the second sheave means as the dragline is retracted toward the carriage.

5. The log skidding carriage of claim 1, wherein the power cylinder means comprises a double acting hydraulic cylinder, the carriage further comprising:

a source of pressurized hydraulic fluid;

control valve means operably connected between the source of fluid and the hydraulic cylinder for alternately directing pressurized hydraulic fluid to opposite ends of the hydraulic cylinder when actuated; and limit means operably connected to the control valve means for actuating the control valve means in response to detection of an incongruity in the dragline adjacent to the second sheave means as it is retracted toward the carriage.

* * * * *